US011941587B2

(12) United States Patent
Higashide et al.

(10) Patent No.: US 11,941,587 B2
(45) Date of Patent: Mar. 26, 2024

(54) INFORMATION PROCESSING APPARATUS, INFORMATION PROCESSING SYSTEM, NON-TRANSITORY COMPUTER READABLE MEDIUM, AND VEHICLE

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 17/490,074

(22) Filed: Sep. 30, 2021

(65) Prior Publication Data
US 2022/0108281 A1 Apr. 7, 2022

(30) Foreign Application Priority Data
Oct. 1, 2020 (JP) .................................. 2020-167304

(51) Int. Cl.
*G06Q 10/20* (2023.01)
*G06F 3/14* (2006.01)
*G07C 5/00* (2006.01)
*G07C 5/08* (2006.01)

(52) U.S. Cl.
CPC .............. *G06Q 10/20* (2013.01); *G06F 3/14* (2013.01); *G07C 5/008* (2013.01); *G07C 5/0825* (2013.01)

(58) Field of Classification Search
CPC .......... G05Q 10/20; G06F 3/14; G07C 5/008; G07C 5/0825
See application file for complete search history.

(56) References Cited

U.S. PATENT DOCUMENTS

| | | | |
|---|---|---|---|
| 2015/0371456 A1* | 12/2015 | Moore, Jr. ............. | G01S 19/13 701/1 |
| 2019/0235487 A1* | 8/2019 | Zhao ..................... | G08G 1/127 |
| 2019/0375329 A1* | 12/2019 | Whitt .................... | B60W 10/20 |
| 2021/0312406 A1* | 10/2021 | Dedes ................... | G07C 5/008 |

FOREIGN PATENT DOCUMENTS

| | | |
|---|---|---|
| JP | 2009-161345 A | 7/2009 |
| JP | 2010-70267 A | 4/2010 |
| JP | 2020-013379 A | 1/2020 |

* cited by examiner

*Primary Examiner* — Behrang Badii
*Assistant Examiner* — Jay Khandpur
(74) *Attorney, Agent, or Firm* — Oliff PLC

(57) ABSTRACT

An information processing apparatus manages the operation of an alternative vehicle when a vehicle recovers from a failure. The information processing apparatus includes a controller. The controller is configured to determine, when it is judged that the vehicle is not operational due to failure of the vehicle, to introduce an alternative vehicle to replace the vehicle, and when recovery information indicating that the vehicle has recovered from the failure is acquired, maintain the determination to introduce the alternative vehicle or cancel the introduction of the alternative vehicle and redetermine the recovered vehicle as being operational.

14 Claims, 6 Drawing Sheets

INFORMATION PROCESSING APPARATUS, INFORMATION PROCESSING SYSTEM, NON-TRANSITORY COMPUTER READABLE MEDIUM, AND VEHICLE

CROSS-REFERENCE TO RELATED APPLICATION

This application claims priority to Japanese Patent Application No. 2020-167304, filed on Oct. 1, 2020, the entire contents of which are incorporated herein by reference.

TECHNICAL FIELD

The present disclosure relates to an information processing apparatus, an information processing system, a program, and a vehicle.

BACKGROUND

Technology is known for managing the operation schedules of a plurality of vehicles, i.e. an operation plan. For example, patent literature (PTL) 1 discloses a vehicle operation system relating to the replacement of a circulating electric vehicle.

CITATION LIST

Patent Literature

PTL 1: JP 2020-013379 A

SUMMARY

The introduction of an alternative vehicle in the event of failure of a traveling vehicle, however, has not been considered. From this perspective, known technology has room for improvement.

It would be helpful to provide technology to enable optimal operational management that takes into consideration the load incurred by the introduction of an alternative vehicle.

An information processing apparatus according to an embodiment of the present disclosure is an information processing apparatus for managing operation of an alternative vehicle when a vehicle recovers from a failure, the information processing apparatus including a controller configured to:
 determine, when it is judged that the vehicle is not operational due to failure of the vehicle, to introduce an alternative vehicle to replace the vehicle, and when recovery information indicating that the vehicle has recovered from the failure is acquired, maintain the determination to introduce the alternative vehicle or cancel the introduction of the alternative vehicle and redetermine the recovered vehicle as being operational.

A program according to an embodiment of the present disclosure is configured to cause an information processing apparatus, for managing operation of an alternative vehicle when a vehicle recovers from a failure, to execute operations including:
 judging that the vehicle is not operational due to the failure of the vehicle;
 determining to introduce the alternative vehicle to replace the vehicle;
 acquiring recovery information indicating that the vehicle has recovered from the failure; and
 maintaining the determination to introduce the alternative vehicle or canceling the introduction of the alternative vehicle and redetermining the recovered vehicle as being operational.

A vehicle according to an embodiment of the present disclosure is a vehicle for managing operation of an alternative vehicle when the vehicle recovers from a failure, the vehicle including a controller configured to:
 determine, when it is judged that the vehicle is not operational due to failure of the vehicle, to introduce an alternative vehicle to replace the vehicle, and when recovery information indicating that the vehicle has recovered from the failure is acquired, maintain the determination to introduce the alternative vehicle or cancel the introduction of the alternative vehicle and redetermine the recovered vehicle as being operational.

The information processing apparatus, the information processing system, the program, and the vehicle according to embodiments of the present disclosure enable optimal operational management that takes into consideration the load incurred by the introduction of an alternative vehicle.

DETAILED DESCRIPTION

Embodiments of the present disclosure are described below with reference to the drawings.

Figure 1:
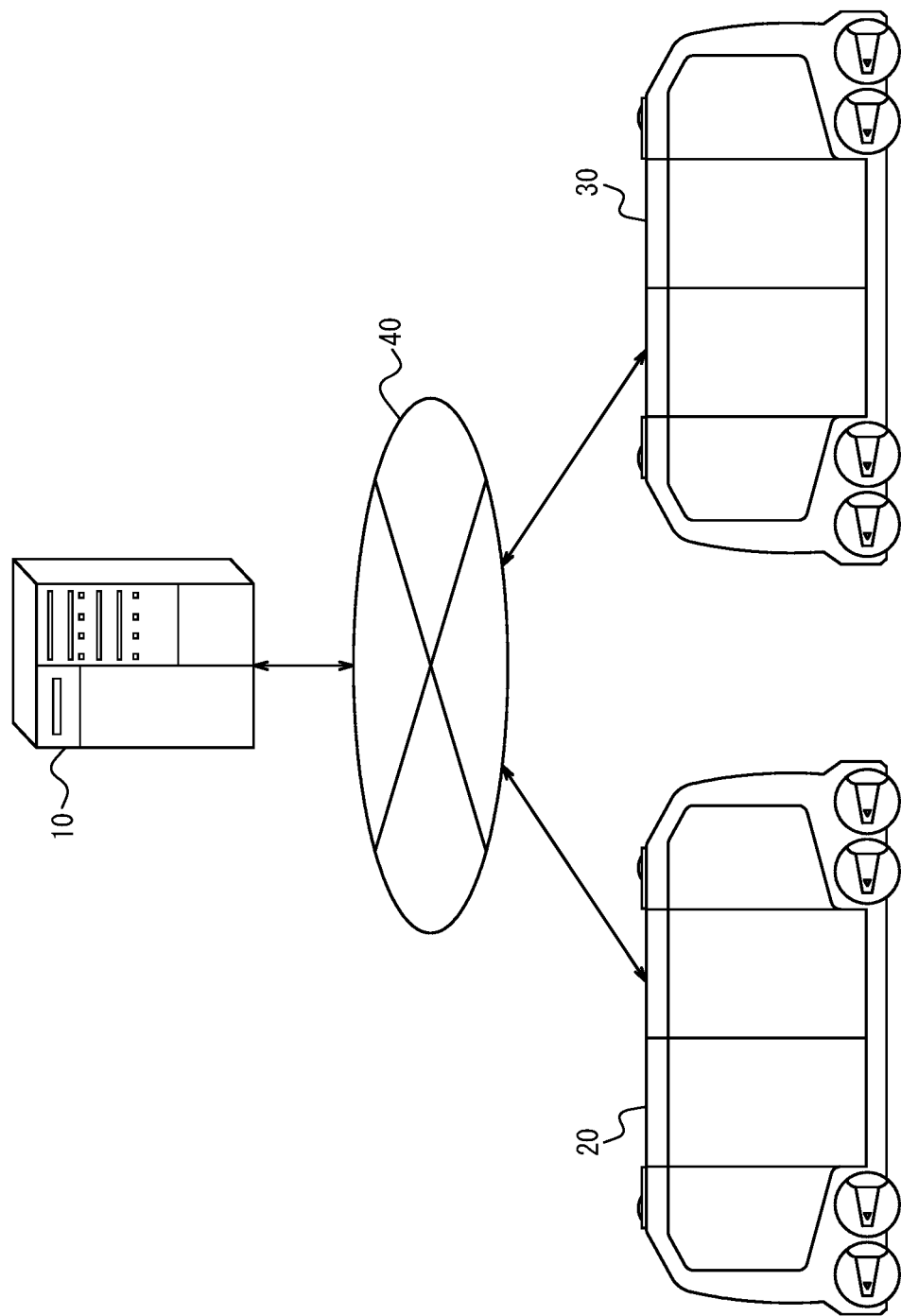
FIG. 1 is a configuration diagram illustrating a configuration of an information processing system that includes an information processing apparatus according to an embodiment of the present disclosure.

FIG. 1 is a configuration diagram illustrating a configuration of an information processing system 1 that includes an information processing apparatus 10 according to an embodiment of the present disclosure. With reference to FIG. 1, an overview of the information processing system 1 that includes the information processing apparatus 10 according to an embodiment of the present disclosure is primarily described. In addition to the information processing apparatus 10, the information processing system 1 includes a vehicle 20 and an alternative vehicle 30.

In FIG. 1, one each of the information processing apparatus 10, the vehicle 20, and the alternative vehicle 30 are illustrated for the sake of simplicity, but the number of information processing apparatuses 10, vehicles 20, and alternative vehicles 30 included in the information processing system 1 may be two or more of each. For example, the information processing system 1 may introduce a plurality of alternative vehicles 30 when a plurality of vehicles 20 fail. Each of the information processing apparatus 10, the vehicle 20, and the alternative vehicle 30 is communicably connected to a network 40 including, for example, a mobile communication network and/or the Internet.

The information processing apparatus 10 is a single server apparatus or a plurality of server apparatuses that can communicate with each other. The information processing apparatus 10 is not limited to being a server apparatus and may be any general purpose electronic device, such as a personal computer (PC) or smartphone, or may be another electronic device dedicated to the information processing system 1.

The vehicle 20 includes, for example, a bus that travels with passengers on board. The vehicle 20 may travel back and forth between two predetermined points while stopping along the way at one or more stops or may travel in one direction along a circulation route while stopping along the way at one or more stops. The vehicle 20 is not limited to this example and may include any vehicle that allows passengers to board and that makes stops.

The vehicle 20 is, for example, a vehicle that performs autonomous driving. The autonomous driving may be at any level from level 1 to level 5 as defined by the Society of Automotive Engineers (SAE), for example, but is not limited to these levels and may be defined in any appropriate way. The vehicle 20 is not limited to a vehicle that performs autonomous driving and may be any vehicle driven by a driver.

The alternative vehicle 30 includes, for example, a bus that travels with passengers on board in place of the vehicle 20 when the vehicle 20 fails. The alternative vehicle 30 may travel back and forth between two predetermined points while stopping along the way at one or more stops or may travel in one direction along a circulation route while stopping along the way at one or more stops. The alternative vehicle 30 is not limited to this example and may include any vehicle that allows passengers to board and that makes stops.

The alternative vehicle 30 is, for example, a vehicle that performs autonomous driving. The autonomous driving may be at any level from level 1 to level 5 as defined by the Society of Automotive Engineers (SAE), for example, but is not limited to these levels and may be defined in any appropriate way. The alternative vehicle 30 is not limited to a vehicle that performs autonomous driving and may be any vehicle driven by a driver.

As a summary of an embodiment, the information processing apparatus 10 manages the operation of the alternative vehicle 30 when the vehicle 20 recovers from a failure. When it is judged that the vehicle 20 is not operational due to failure of the vehicle 20, the information processing apparatus 10 determines to introduce the alternative vehicle 30 to replace the vehicle 20. When recovery information indicating that the vehicle 20 has recovered from the failure is acquired, the information processing apparatus 10 maintains the determination to introduce the alternative vehicle 30 or cancels the introduction of the alternative vehicle 30 and redetermines the recovered vehicle 20 as being operational. In the present disclosure, the "recovery information" includes, for example, a notification of recovery, a degree of recovery indicating the degree of recovery from failure, or the like.

Figure 2:
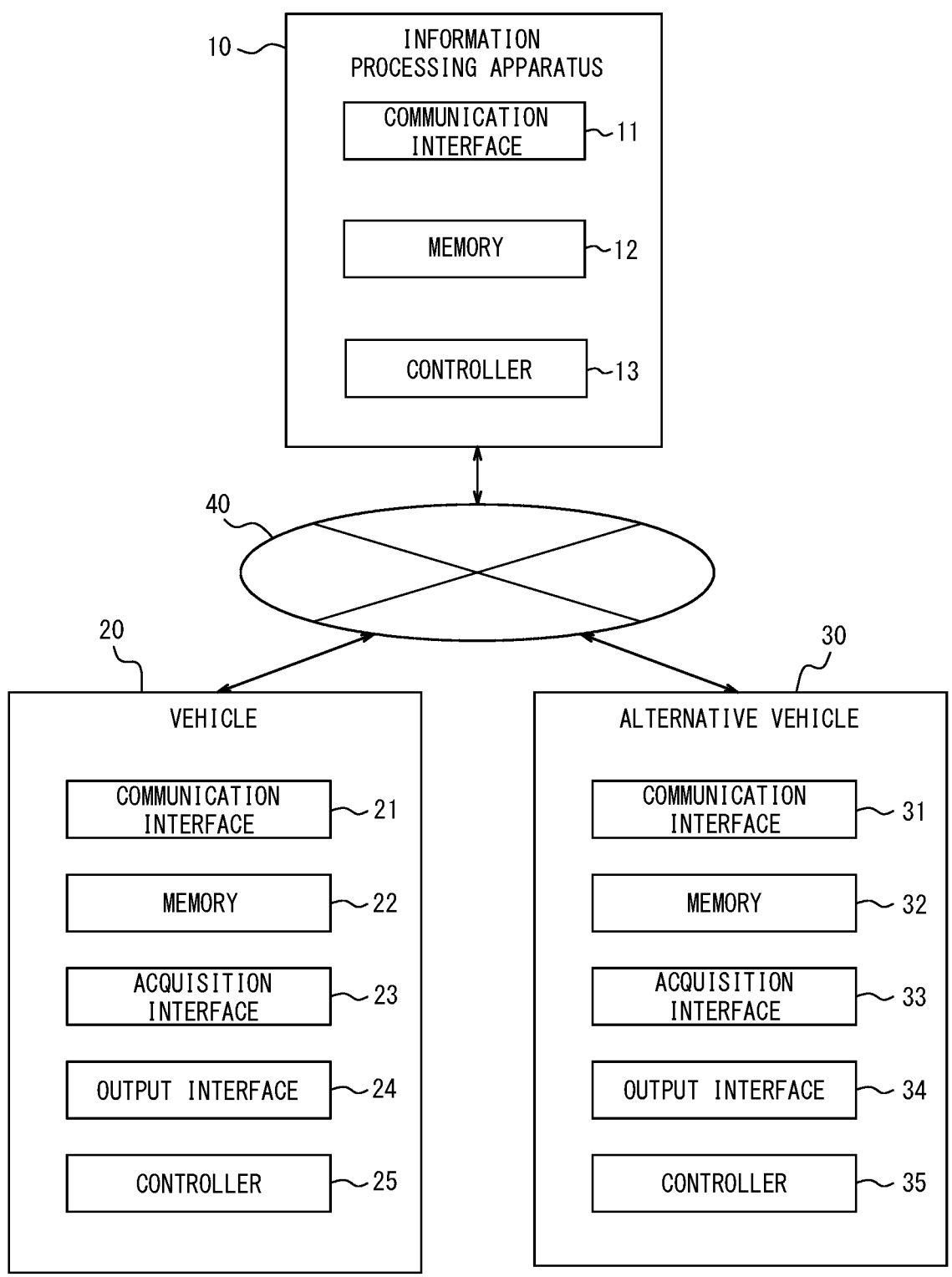
FIG. 2 is a functional block diagram illustrating schematic configurations of the information processing apparatus, a vehicle, and an alternative vehicle of FIG. 1.

Next, with reference to FIG. 2, configurations of the information processing apparatus 10, the vehicle 20, and the alternative vehicle 30 included in the information processing system 1 are primarily described. FIG. 2 is a functional block diagram illustrating schematic configurations of the information processing apparatus 10, the vehicle 20, and the alternative vehicle 30 of FIG. 1.

As illustrated in FIG. 2, the information processing apparatus 10 includes a communication interface 11, a memory 12, and a controller 13.

The communication interface 11 includes a communication module that connects to the network 40. For example, the communication interface 11 may include a communication module compliant with mobile communication standards such as 4th Generation (4G) and 5th Generation (5G) or with Internet standards. In an embodiment, the information processing apparatus 10 is connected to the network 40 via the communication interface 11. The communication interface 11 transmits and receives various information via the network 40.

The memory 12 is, for example, a semiconductor memory, a magnetic memory, an optical memory, or the like, but is not limited to these. The memory 12 may, for example, function as a main memory, an auxiliary memory, or a cache memory. The memory 12 stores any information used for operations of the information processing apparatus 10. For example, the memory 12 may store a system program, an application program, various types of information received or transmitted by the communication interface 11, and the like. The information stored in the memory 12 may, for example, be updated with information received from the network 40 via the communication interface 11.

The controller 13 includes one or more processors. The "processor" in an embodiment is a general purpose processor or a dedicated processor that is dedicated to specific processing, but the processor is not limited to these. The controller 13 is communicably connected to each component forming the information processing apparatus 10 and controls operations of the information processing apparatus 10 overall.

Next, the configuration of the vehicle 20 included in the information processing system 1 is primarily described. As illustrated in FIG. 2, the vehicle 20 includes a communication interface 21, a memory 22, an acquisition interface 23, an output interface 24, and a controller 25. The communication interface 21, the memory 22, the acquisition interface 23, the output interface 24, and the controller 25 are, for example, communicably connected to each other via an in-vehicle network, such as a controller area network (CAN), or a dedicated line.

The communication interface 21 includes a communication module that connects to the network 40. For example, the communication interface 21 may include a communication module compliant with mobile communication standards such as 4G and 5G. In an embodiment, the vehicle 20 is connected to the network 40 via the communication interface 21. The communication interface 21 transmits and receives various information via the network 40.

The memory 22 is, for example, a semiconductor memory, a magnetic memory, an optical memory, or the like, but is not limited to these. The memory 22 may, for example, function as a main memory, an auxiliary memory, or a cache memory. The memory 22 stores any information used for operations of the vehicle 20. For example, the memory 22 may store a system program, an application program, various types of information received or transmitted by the communication interface 21, and the like. The information stored in the memory 22 may, for example, be updated with information received from the network 40 via the communication interface 21.

The acquisition interface 23 includes any appropriate module configured to acquire failure information indicating that the vehicle 20 has failed and recovery information indicating that the vehicle 20 has recovered from the failure. For example, the acquisition interface 23 includes a sensor module configured to acquire these pieces of information. In the present disclosure, the "failure information" includes, for example, notification of failure, the content of the failure, and the like.

The acquisition interface 23 includes one or more receivers compliant with any appropriate satellite positioning system. For example, the acquisition interface 23 may include a Global Positioning System (GPS) receiver. The acquisition interface 23 acquires the measured position of the vehicle 20 as positional information. The positional information includes, for example, an address, latitude, longitude, altitude, and the like. The acquisition interface 23 may acquire the positional information for the vehicle 20 continually, regularly, or non-regularly.

The output interface 24 includes one or more interfaces for output configured, for example, to notify passengers waiting at a stop of any appropriate information. For example, the output interface 24 includes digital signage provided on the side surface of the vehicle 20. This example is not limiting, and the output interface 24 may include any appropriate interface for output that stimulates the sense of sight and/or hearing of passengers waiting at the stop. The output interface 24 may, for example, include any other image output interface, other than digital signage, that primarily stimulates the sense of sight of passengers waiting at the stop. The output interface 24 may, for example, include any audio output interface, such as a speaker, that primarily stimulates the sense of hearing of passengers waiting at the stop.

The controller 25 includes one or more processors. The "processor" in an embodiment is a general purpose processor or a dedicated processor that is dedicated to specific processing, but the processor is not limited to these. For example, the controller 25 may include an Electronic Control Unit (ECU). The controller 25 is communicably connected to each component forming the vehicle 20 and controls operations of the vehicle 20 overall.

Next, the configuration of the alternative vehicle 30 included in the information processing system 1 is primarily described. As illustrated in FIG. 2, the alternative vehicle 30 includes a communication interface 31, a memory 32, an acquisition interface 33, an output interface 34, and a controller 35. The communication interface 31, the memory 32, the acquisition interface 33, the output interface 34, and the controller 35 are, for example, communicably connected to each other via an in-vehicle network, such as a CAN, or a dedicated line.

The communication interface 31 includes a communication module that connects to the network 40. For example, the communication interface 31 may include a communication module compliant with mobile communication standards such as 4G and 5G. In an embodiment, the alternative vehicle 30 is connected to the network 40 via the communication interface 31. The communication interface 31 transmits and receives various information via the network 40.

The memory 32 is, for example, a semiconductor memory, a magnetic memory, an optical memory, or the like, but is not limited to these. The memory 32 may, for example, function as a main memory, an auxiliary memory, or a cache memory. The memory 32 stores any information used for operations of the alternative vehicle 30. For example, the memory 32 may store a system program, an application program, various types of information received or transmitted by the communication interface 31, and the like. The information stored in the memory 32 may, for example, be updated with information received from the network 40 via the communication interface 31.

The acquisition interface 33 includes one or more receivers compliant with any appropriate satellite positioning system. For example, the acquisition interface 33 may include a GPS receiver. The acquisition interface 33 acquires the measured position of the alternative vehicle 30 as positional information. The positional information includes, for example, an address, latitude, longitude, altitude, and the like. The acquisition interface 33 may acquire the positional information for the alternative vehicle 30 continually, regularly, or non-regularly.

The output interface 34 includes one or more interfaces for output configured, for example, to notify passengers waiting at a stop of any appropriate information. For example, the output interface 34 includes digital signage provided on the side surface of the alternative vehicle 30. This example is not limiting, and the output interface 34 may include any appropriate interface for output that stimulates the sense of sight and/or hearing of passengers waiting at the stop. The output interface 34 may, for example, include any other image output interface, other than digital signage, that primarily stimulates the sense of sight of passengers waiting at the stop. The output interface 34 may, for example, include any audio output interface, such as a speaker, that primarily stimulates the sense of hearing of passengers waiting at the stop.

The controller 35 includes one or more processors. The "processor" in an embodiment is a general purpose processor or a dedicated processor that is dedicated to specific processing, but the processor is not limited to these. For example, the controller 35 may include an ECU. The controller 35 is communicably connected to each component forming the alternative vehicle 30 and controls operations of the alternative vehicle 30 overall.

Figure 3:
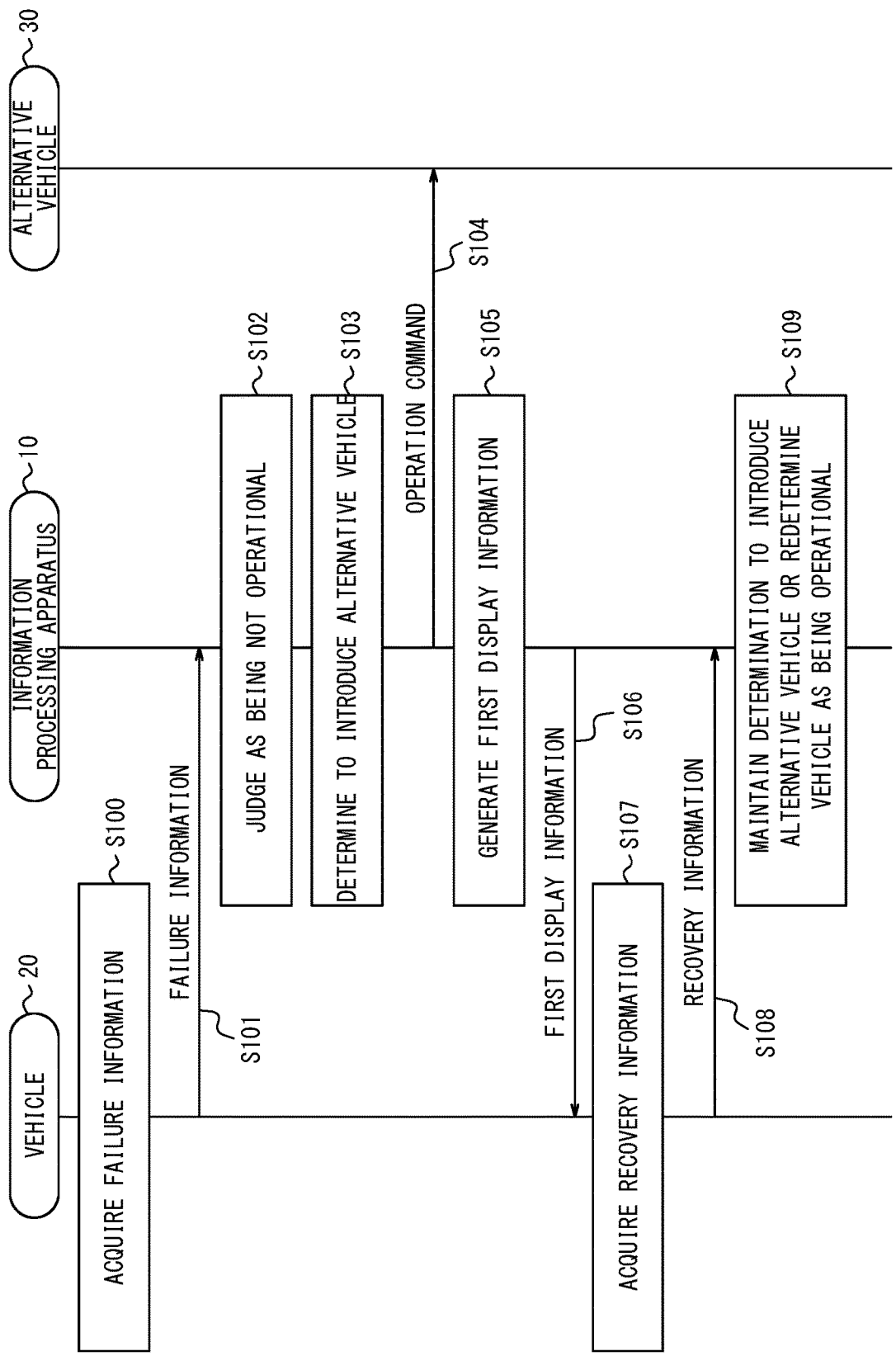
FIG. 3 is a sequence diagram for illustrating an example of an information processing method executed by the information processing system of FIG. 1.

FIG. 3 is a sequence diagram for illustrating an example of an information processing method executed by the information processing system 1 of FIG. 1. With reference to FIG. 3, an example information processing method executed by the information processing system 1 of FIG. 1 is described. The sequence diagram in FIG. 3 illustrates the flow of basic processing of the information processing method executed by the information processing system 1.

In step S100, the controller 25 of the vehicle 20 acquires failure information, indicating that the vehicle 20 has failed, using the acquisition interface 23.

In step S101, the controller 25 of the vehicle 20 transmits the failure information, acquired in step S100, to the information processing apparatus 10 via the communication interface 21 and the network 40. The controller 13 of the information processing apparatus 10 acquires the failure information for the vehicle 20.

In step S102, the controller 13 of the information processing apparatus 10 judges that the vehicle 20 is not operational due to failure of the vehicle 20 based on the failure information acquired in step S101.

When it is judged in step S102 that the vehicle 20 is not operational, the controller 13 of the information processing apparatus 10 determines to introduce the alternative vehicle 30 to replace the vehicle 20 in step S103. For example, the controller 13 of the information processing apparatus 10 may determine to introduce an alternative vehicle 30 with a higher transport capability than the vehicle 20 that failed, so as to relieve crowding in the vehicle cabin associated with disruption of the operation schedule. For example, the controller 13 of the information processing apparatus 10 may determine to introduce an alternative vehicle 30 capable of transporting a greater number of people than the vehicle 20 that failed.

In step S104, the controller 13 of the information processing apparatus 10 transmits an operation command to the alternative vehicle 30 determined in step S103 via the communication interface 11 and the network 40.

When it is judged in step S102 that the vehicle 20 is not operational, the controller 13 of the information processing apparatus 10 generates first display information indicating that the vehicle 20 is not operational in step S105. In the present disclosure, the "first display information" includes, for example, text information such as "Out of Service".

In step S106, the controller 13 of the information processing apparatus 10 transmits the first display information generated in step S105 to the vehicle 20 via the communication interface 11 and the network 40. The controller 13 of the information processing apparatus 10 causes the output interface 24 of the vehicle 20 to output the first display information generated in step S105.

In step S107, the controller 25 of the vehicle 20 acquires recovery information, indicating that the vehicle 20 has recovered from the failure, using the acquisition interface 23.

In step S108, the controller 25 of the vehicle 20 transmits the recovery information, acquired in step S107, to the information processing apparatus 10 via the communication interface 21 and the network 40. The controller 13 of the information processing apparatus 10 acquires the recovery information for the vehicle 20.

When the recovery information is acquired in step S108, the information processing apparatus 10 maintains the determination to introduce the alternative vehicle 30 or cancels the introduction of the alternative vehicle 30 and redetermines the recovered vehicle 20 as being operational in step S109.

Figure 4:
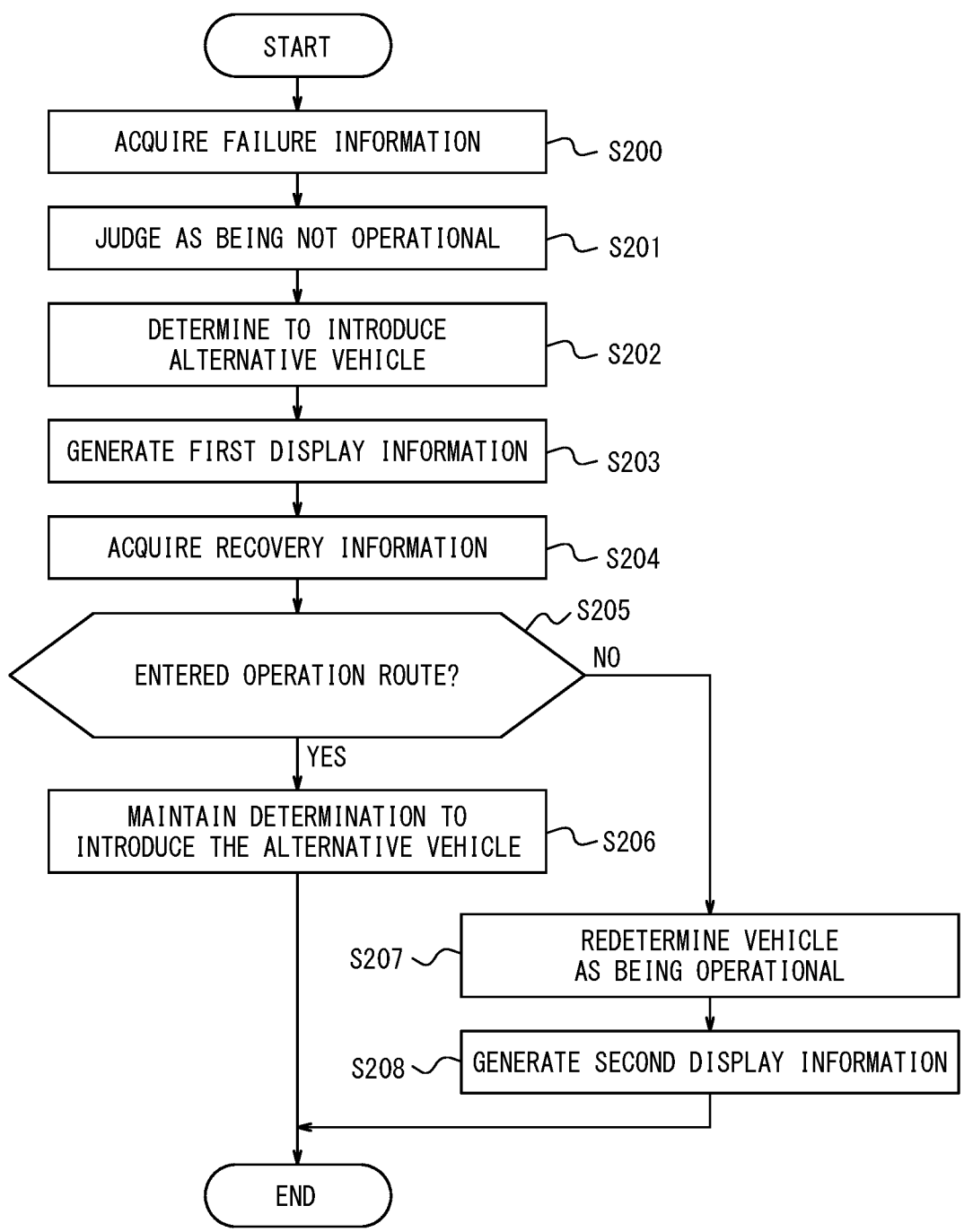
FIG. 4 is a flowchart illustrating a first example of an information processing method executed by the information processing apparatus of FIG. 1.

FIG. 4 is a flowchart illustrating a first example of an information processing method executed by the information processing apparatus 10 of FIG. 1. In the flowchart in FIG. 4, the controller 13 of the information processing apparatus 10 executes the same process as step S109 of FIG. 3, based on the timing when the alternative vehicle 30 enters the operation route after the introduction of the alternative vehicle 30 is determined. For example, when recovery information is acquired after the alternative vehicle 30 enters the operation route, the controller 13 maintains the determination to introduce the alternative vehicle 30. For example, when recovery information is acquired before the alternative vehicle 30 enters the operation route, the controller 13 cancels the introduction of the alternative vehicle 30 and redetermines the recovered vehicle 20 as being operational.

In step S200, the controller 13 of the information processing apparatus 10 acquires the failure information for the vehicle 20. For example, the controller 13 receives the failure information for the vehicle 20 from the vehicle 20 via the network 40 and the communication interface 11.

In step S201, the controller 13 judges that the vehicle 20 is not operational due to failure of the vehicle 20 based on the failure information acquired in step S200.

When it is judged in step S201 that the vehicle 20 is not operational, the controller 13 determines to introduce the alternative vehicle 30 to replace the vehicle 20 in step S202. At this time, the controller 13 transmits an operation command to the determined alternative vehicle 30 via the communication interface 11 and the network 40.

When it is judged in step S201 that the vehicle 20 is not operational, the information processing apparatus 10 generates first display information indicating that the vehicle 20 is not operational in step S203. At this time, the controller 13 causes the output interface 24 of the vehicle 20 to output the generated first display information.

In step S204, the controller 13 acquires recovery information indicating that the vehicle 20 has recovered from the failure. For example, the controller 13 receives the recovery information for the vehicle 20 from the vehicle 20 via the network 40 and the communication interface 11.

In step S205, the controller 13 judges whether the alternative vehicle 30 has entered the operation route. For example, the controller 13 may judge whether the alternative vehicle 30 has entered the operation route based on positional information of the alternative vehicle 30 acquired via the acquisition interface 33 of the alternative vehicle 30. When it is judged that the alternative vehicle 30 has entered the operation route, the controller 13 executes the process of step S206. When it is judged that the alternative vehicle 30 has not entered the operation route, the controller 13 executes the process of step S207.

When it is judged in step S205 that the alternative vehicle 30 has entered the operation route, the controller 13 maintains the determination to introduce the alternative vehicle 30 in step S206.

When it is judged in step S205 that the alternative vehicle 30 has not entered the operation route, the controller 13 cancels the introduction of the alternative vehicle 30 and redetermines the recovered vehicle 20 as being operational in step S207.

When the vehicle 20 is redetermined as being operational in step S207, the controller 13 generates second display information indicating that the vehicle 20 has recovered from the failure in step S208. At this time, the controller 13 causes the output interface 24 of the vehicle 20 to output the generated second display information. In the present disclosure, the "second display information" includes, for example, text information such as "Recovered".

Figure 5:
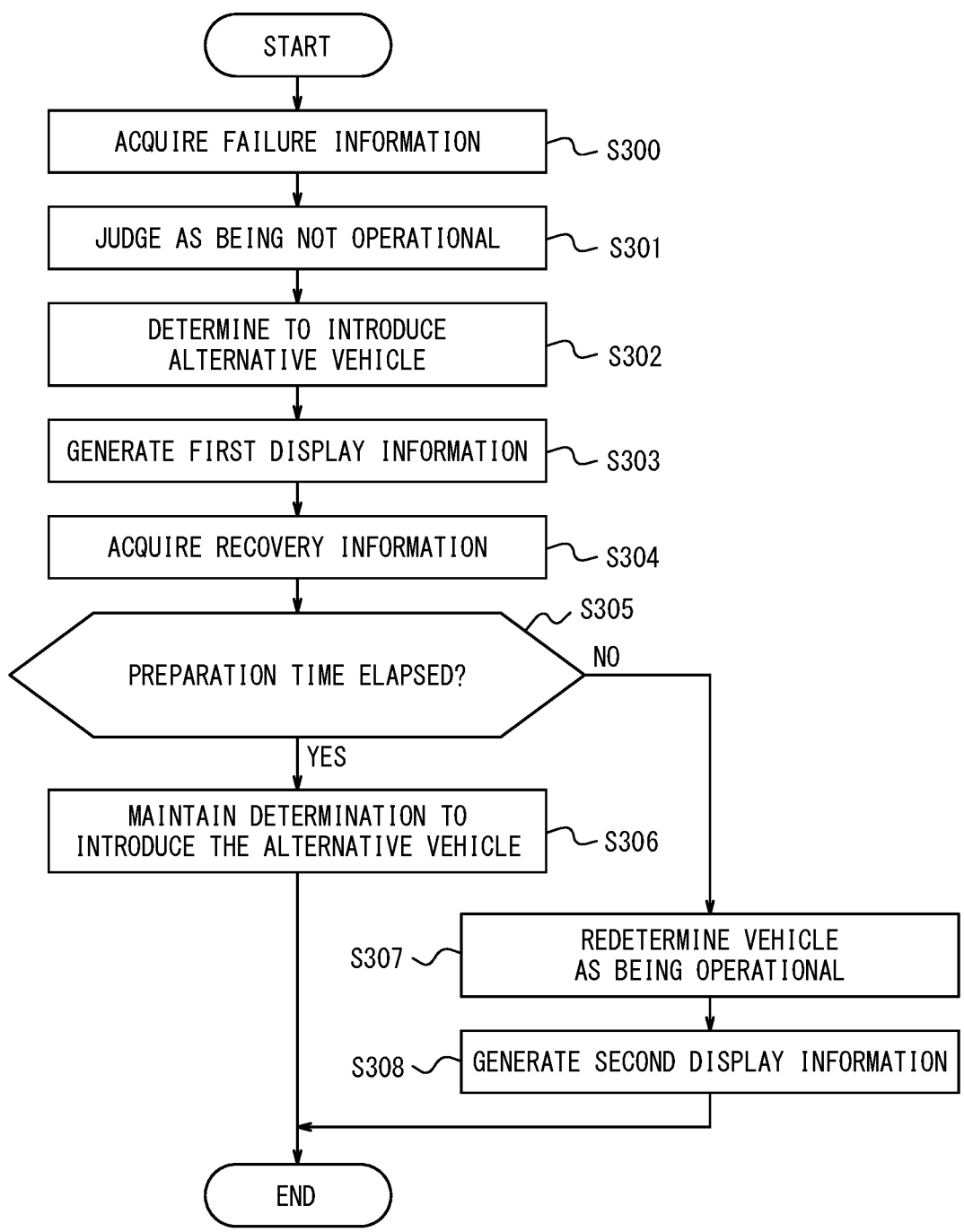
FIG. 5 is a flowchart illustrating a second example of an information processing method executed by the information processing apparatus of FIG. 1.

FIG. 5 is a flowchart illustrating a second example of an information processing method executed by the information processing apparatus 10 of FIG. 1. In the flowchart in FIG. 5, the controller 13 of the information processing apparatus 10 executes the same process as step S109 of FIG. 3, based on the preparation time from when introduction of the alternative vehicle 30 is determined until the alternative vehicle 30 enters the operation route. For example, when the recovery information is acquired after the preparation time has elapsed, the controller 13 maintains the determination to introduce the alternative vehicle 30. For example, when recovery information is acquired before the preparation time has elapsed, the controller 13 cancels the introduction of the alternative vehicle 30 and redetermines the recovered vehicle 20 as being operational.

In step S300, the controller 13 of the information processing apparatus 10 acquires the failure information for the vehicle 20. For example, the controller 13 receives the failure information for the vehicle 20 from the vehicle 20 via the network 40 and the communication interface 11.

In step S301, the controller 13 judges that the vehicle 20 is not operational due to failure of the vehicle 20 based on the failure information acquired in step S300.

When it is judged in step S301 that the vehicle 20 is not operational, the controller 13 determines to introduce the alternative vehicle 30 to replace the vehicle 20 in step S302. At this time, the controller 13 transmits an operation command to the determined alternative vehicle 30 via the communication interface 11 and the network 40.

When it is judged in step S301 that the vehicle 20 is not operational, the information processing apparatus 10 generates first display information indicating that the vehicle 20 is not operational in step S303. At this time, the controller 13 causes the output interface 24 of the vehicle 20 to output the generated first display information.

In step S304, the controller 13 acquires recovery information indicating that the vehicle 20 has recovered from the failure. For example, the controller 13 receives the recovery information for the vehicle 20 from the vehicle 20 via the network 40 and the communication interface 11.

In step S305, the controller 13 judges whether the preparation time from when introduction of the alternative vehicle 30 is determined in step S302 until the alternative vehicle 30 enters the operation route has elapsed. For example, the controller 13 may acquire such information on the preparation time from an operation management company that manages the operation of the vehicle 20 and the alternative vehicle 30. For example, the controller 13 may receive information on the average preparation time for a plurality of alternative vehicles 30 from a terminal apparatus of the operation management company via the network 40 and the communication interface 11. When it is judged that the preparation time has elapsed, the controller 13 executes the process of step S306. When it is judged that the preparation time has not elapsed, the controller 13 executes the process of step S307.

When it is judged in step S305 that the preparation time has elapsed, the controller 13 maintains the determination to introduce the alternative vehicle 30 in step S306.

When it is judged in step S305 that the preparation time has not elapsed, the controller 13 cancels the introduction of the alternative vehicle 30 and redetermines the recovered vehicle 20 as being operational in step S307.

When the vehicle 20 is redetermined as being operational in step S307, the controller 13 generates second display information indicating that the vehicle 20 has recovered from the failure in step S308. At this time, the controller 13 causes the output interface 24 of the vehicle 20 to output the generated second display information.

Figure 6:
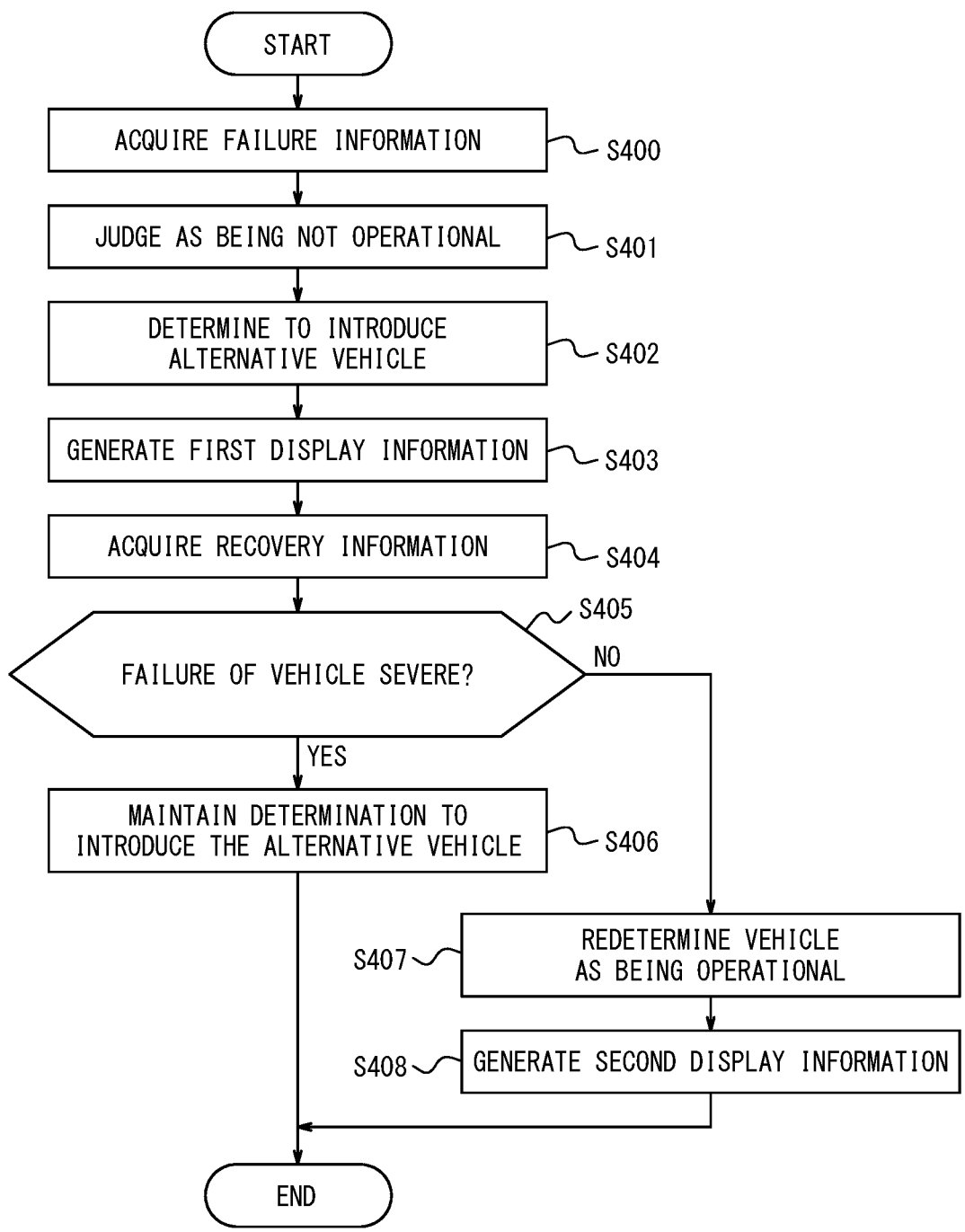
FIG. 6 is a flowchart illustrating a third example of an information processing method executed by the information processing apparatus of FIG. 1.

FIG. 6 is a flowchart illustrating a third example of an information processing method executed by the information processing apparatus 10 of FIG. 1. In the flowchart in FIG. 6, the controller 13 of the information processing apparatus 10 executes the same process as step S109 of FIG. 3, based on the content of the failure of the vehicle 20. For example, when it is judged that the failure of the vehicle 20 is severe, the controller 13 maintains the determination to introduce the alternative vehicle 30. For example, when it is judged that failure of the vehicle 20 is minor, the controller 13 cancels the introduction of the alternative vehicle 30 and redetermines the recovered vehicle 20 as being operational.

In step S400, the controller 13 of the information processing apparatus 10 acquires the failure information for the vehicle 20. For example, the controller 13 receives the failure information for the vehicle 20 from the vehicle 20 via the network 40 and the communication interface 11.

In step S401, the controller 13 judges that the vehicle 20 is not operational due to failure of the vehicle 20 based on the failure information acquired in step S400.

When it is judged in step S401 that the vehicle 20 is not operational, the controller 13 determines to introduce the alternative vehicle 30 to replace the vehicle 20 in step S402. At this time, the controller 13 transmits an operation command to the determined alternative vehicle 30 via the communication interface 11 and the network 40.

When it is judged in step S401 that the vehicle 20 is not operational, the information processing apparatus 10 generates first display information indicating that the vehicle 20 is not operational in step S403. At this time, the controller 13 causes the output interface 24 of the vehicle 20 to output the generated first display information.

In step S404, the controller 13 acquires recovery information indicating that the vehicle 20 has recovered from the failure. For example, the controller 13 receives the recovery information for the vehicle 20 from the vehicle 20 via the network 40 and the communication interface 11.

In step S405, the controller 13 judges whether the failure of the vehicle 20 is severe. For example, the controller 13 may analyze the content of the failure included in the failure information acquired in step S400 to determine whether the failure of the vehicle 20 is severe. At this time, the controller 13 may, for example, refer to any past data associating the content of the failure of the vehicle 20 with information indicating severe or minor. When it is judged that the failure of the vehicle 20 is severe, the controller 13 executes the process of step S406. When it is judged that the failure of the vehicle 20 is not severe, i.e. minor, the controller 13 executes the process of step S407.

When it is judged in step S405 that the failure of the vehicle 20 is severe, the controller 13 maintains the determination to introduce the alternative vehicle 30 in step S406. That is, the controller 13 maintains the decision to introduce the alternative vehicle 30 when it is judged that the failure of the vehicle 20 is severe and that the vehicle 20 is likely to become inoperable again even if the recovery information is acquired.

When it is judged in step S405 that the failure of the vehicle 20 is not severe, the controller 13 cancels the introduction of the alternative vehicle 30 and redetermines the recovered vehicle 20 as being operational in step S407. That is, the controller 13 redetermines the recovered vehicle 20 as being operational when it is judged that the failure of the vehicle 20 is minor and that the vehicle 20 can operate stably after the recovery information is acquired.

When the vehicle 20 is redetermined as being operational in step S407, the controller 13 generates second display information indicating that the vehicle 20 has recovered from the failure in step S408. At this time, the controller 13 causes the output interface 24 of the vehicle 20 to output the generated second display information.

According to the above embodiment, optimal operational management that takes into account the load, including time, human resources, and costs, incurred by the introduction of the alternative vehicle can be achieved. For example, when recovery information indicating that the vehicle 20 has recovered from the failure is acquired, the information processing apparatus 10 maintains the determination to introduce the alternative vehicle 30 or cancels the introduction of the alternative vehicle 30 and redetermines the recovered vehicle 20 as being operational. This enables the information processing apparatus 10 to achieve optimal operation management while balancing the load incurred by the introduction of the alternative vehicle 30 with a reduction in the disruption of the operation schedule.

When recovery information is acquired after the alternative vehicle 30 enters the operation route, the information processing apparatus 10 maintains the determination to introduce the alternative vehicle 30. Since a long time has already elapsed since failure of the vehicle 20, and the load incurred by introduction of the alternative vehicle 30 has grown large, the information processing apparatus 10 can thus manage operation of the alternative vehicle 30 by prioritizing the load incurred by introduction of the alternative vehicle 30 over a reduction in disruption of the operation schedule. That is, the information processing apparatus 10 can achieve optimal operation management that prevents the load incurred until acquisition of the recovery information from going to waste.

Conversely, when recovery information is acquired before the alternative vehicle 30 enters the operation route, the information processing apparatus 10 cancels the introduction of the alternative vehicle 30 and redetermines the recovered vehicle 20 as being operational. Since only a short time has elapsed since failure of the vehicle 20, and the load incurred by introduction of the alternative vehicle 30 is still small, the information processing apparatus 10 can thus manage operation of the vehicle 20 by prioritizing a reduction in disruption of the operation schedule over the load incurred by introduction of the alternative vehicle 30. That is, the information processing apparatus 10 can achieve optimal operation management that can maximize the reduction in disruption of the operation schedule.

When the recovery information is acquired after the preparation time from when introduction of the alternative vehicle 30 is determined until the alternative vehicle 30 enters the operation route has elapsed, the information processing apparatus 10 maintains the determination to introduce the alternative vehicle 30. Since a long time has already elapsed since failure of the vehicle 20, and the load incurred by introduction of the alternative vehicle 30 has grown large, the information processing apparatus 10 can thus manage operation of the alternative vehicle 30 by prioritizing the load incurred by introduction of the alternative vehicle 30 over a reduction in disruption of the operation schedule. That is, the information processing apparatus 10 can achieve optimal operation management that prevents the load incurred until acquisition of the recovery information from going to waste.

Conversely, when recovery information is acquired before the preparation time from when introduction of the alternative vehicle 30 is determined until the alternative vehicle 30 enters the operation route has elapsed, the information processing apparatus 10 cancels the introduction of the alternative vehicle 30 and redetermines the recovered vehicle 20 as being operational. Since only a short time has elapsed since failure of the vehicle 20, and the load incurred by introduction of the alternative vehicle 30 is still small, the information processing apparatus 10 can thus manage operation of the vehicle 20 by prioritizing a reduction in disruption of the operation schedule over the load incurred by introduction of the alternative vehicle 30. That is, the information processing apparatus 10 can achieve optimal operation management that can maximize the reduction in disruption of the operation schedule.

When it is judged that the failure of the vehicle 20 is serious, the information processing apparatus 10 maintains the determination to introduce the alternative vehicle 30. Since the vehicle 20 is likely to become inoperable again even if the recovery information is acquired, the information processing apparatus can thus manage operation of the alternative vehicle 30 by prioritizing a reduction in disruption of the operation schedule over the load incurred by introduction of the alternative vehicle 30. That is, the information processing apparatus 10 can achieve optimal operation management that prevents disruption of the operation schedule from expanding further in the future due to repeated failure of the vehicle 20.

Conversely, when it is judged that failure of the vehicle 20 is minor, the information processing apparatus 10 cancels the introduction of the alternative vehicle 30 and redetermines the recovered vehicle 20 as being operational. Since the vehicle 20 can operate stably after the recovery information is acquired, the information processing apparatus 10 can thus manage operation of the vehicle 20 by prioritizing the load incurred by introduction of the alternative vehicle 30 over a reduction in disruption of the operation schedule. That is, the information processing apparatus 10 can achieve optimal operation management that prevents the load incurred by introduction of the alternative vehicle 30 after acquisition of the recovery information from increasing further.

By causing the vehicle 20 to output the first display information indicating that the vehicle 20 is not operational, the information processing apparatus 10 can easily notify passengers waiting at a stop, for example, that the vehicle 20 is not operational. Passengers are thereby prevented from mistakenly boarding the vehicle 20 that is not operational.

By causing the vehicle 20 to output the second display information indicating recovery from the failure, the information processing apparatus 10 can easily notify passengers waiting at a stop, for example, that the vehicle 20 has recovered from the failure. Passengers can thereby easily learn the status of the vehicle 20 with respect to failure and recovery.

By determining to introduce an alternative vehicle 30 with a higher transport capability than the vehicle 20, the information processing apparatus 10 can relieve crowding in the vehicle cabin associated with disruption of the operation schedule. This can prevent a delay in boarding of the alternative vehicle 30 by the passengers at the stop due to crowding in the vehicle cabin and can further reduce disruption of the operation schedule.

While the present disclosure has been described based on the drawings and examples, it should be noted that various changes and modifications may be made by those skilled in the art based on the present disclosure. Accordingly, such modifications and revisions are included within the scope of the present disclosure. For example, the functions and the like included in each component, step, or the like can be rearranged in a logically consistent manner. A plurality of components, steps, or the like may be combined into one, or a single component, step, or the like may be divided.

For example, at least some of the processing operations performed in the information processing apparatus 10 in the above embodiment may be performed in the vehicle 20 or the alternative vehicle 30. For example, instead of the information processing apparatus 10, the vehicle 20 itself may perform the processing operations described above with respect to the information processing apparatus 10. At least a portion of the processing operations performed in the vehicle 20 or the alternative vehicle 30 may be performed in the information processing apparatus 10.

For example, a general purpose electronic device, such as a smartphone or a computer, can also be configured to function as the information processing apparatus 10 according to the above embodiment. Specifically, a program describing the processing content for realizing the functions of the information processing apparatus 10 and the like according to the embodiment is stored in a memory of the electronic device, and the program is read and executed by the processor of the electronic device. Accordingly, the present disclosure can also be embodied as a program executable by a processor.

Alternatively, an embodiment of the present disclosure may be implemented as a non-transitory computer readable medium that stores a program executable by one or more processors to cause the information processing apparatus 10 according to the embodiment or the like to perform the various functions. It is to be understood that these embodiments are also included within the scope of the present disclosure.

For example, the information processing apparatus 10 in the above embodiment may be mounted in the vehicle 20. At this time, the information processing apparatus 10 may communicate information directly with the vehicle 20 without passing through the network 40.

In the above embodiment, the information processing apparatus 10 has been described as judging that the vehicle 20 is not operational by acquiring the failure information from the vehicle 20 and receiving notification of failure directly from the vehicle 20, but this example is not limiting. For example, the information processing apparatus 10 may execute its own similar judgment process while observing the operation status of the vehicle 20.

In the above embodiment, the information processing apparatus 10 has been described as acquiring the recovery information from the vehicle 20, but this example is not limiting. For example, the information processing apparatus 10 may acquire the recovery information of the vehicle 20 on its own while observing the operation status of the vehicle 20.

The information processing apparatus 10 may execute the first example to the third example of the information processing method, described respectively with reference to FIGS. 4 to 6, individually or may execute a combination of at least two information processing methods in parallel or independently. For example, even if the recovery information is acquired before the alternative vehicle 30 enters the operation route, the information processing apparatus 10 may maintain the determination to introduce the alternative vehicle 30, rather than redetermining the recovered vehicle 20 as being operational, when it is judged that the failure of the vehicle 20 is severe.

In the above embodiment, the information processing apparatus 10 has been described as causing the vehicle 20 to output the first display information indicating that the vehicle 20 is not operational, but this example is not limiting. For example, the information processing apparatus 10 need not generate, or cause the vehicle 20 to output, such first display information. For example, instead of or in addition to the vehicle 20, the information processing apparatus 10 may cause an image output interface, such as digital signage installed at a stop, to output the first display information.

In the above embodiment, the information processing apparatus 10 has been described as causing the vehicle 20 to output the second display information indicating recovery from the failure, but this example is not limiting. For example, the information processing apparatus 10 need not generate, or cause the vehicle 20 to output, such second display information. For example, instead of or in addition to the vehicle 20, the information processing apparatus 10 may cause an image output interface, such as digital signage installed at a stop, to output the second display information.

In the above embodiment, the information processing apparatus 10 has been described as acquiring the failure information from the vehicle 20 and receiving the content of the failure directly from the vehicle 20, but this example is not limiting. For example, the information processing apparatus 10 may, on its own, estimate the content of the failure of the vehicle 20 based on the travel history of the vehicle 20.

The invention claimed is:

1. An information processing apparatus for managing operation of an alternative vehicle when a vehicle recovers from a failure, the information processing apparatus comprising a controller configured to:
   determine, when it is judged that the vehicle is not operational due to failure of the vehicle, to introduce an alternative vehicle to replace the vehicle, and when recovery information indicating that the vehicle has recovered from the failure is acquired, maintain the determination to introduce the alternative vehicle or cancel the introduction of the alternative vehicle and redetermine the recovered vehicle as being operational, and
   maintain the determination to introduce the alternative vehicle when the recovery information is acquired after the alternative vehicle has entered an operation route.

2. The information processing apparatus of claim 1, wherein the controller is configured to maintain the determination to introduce the alternative vehicle when it is judged that the failure of the vehicle is severe.

3. The information processing apparatus of claim 1, wherein the controller is configured to cause the vehicle to output first display information indicating that the vehicle is not operational when it is judged that the vehicle is not operational due to the failure of the vehicle.

4. The information processing apparatus of claim 1, wherein the controller is configured to cause the vehicle to output second display information indicating recovery from the failure when the controller cancels the introduction of the alternative vehicle and redetermines the recovered vehicle as being operational.

5. The information processing apparatus of claim 1, wherein the controller is configured to determine to introduce an alternative vehicle with a higher transport capability than the vehicle.

6. An information processing system comprising:
   the information processing apparatus of claim 1;
   the vehicle configured to provide failure information indicating that the vehicle has failed to the information processing apparatus; and
   the alternative vehicle to replace the vehicle.

7. A non-transitory computer readable medium storing a program executable by one or more processors and configured to cause an information processing apparatus, for managing operation of an alternative vehicle when a vehicle recovers from a failure, to execute functions comprising:
   judging that the vehicle is not operational due to the failure of the vehicle;
   determining to introduce the alternative vehicle to replace the vehicle;
   acquiring recovery information indicating that the vehicle has recovered from the failure; and
   maintaining the determination to introduce the alternative vehicle,
   wherein the maintaining the determination to introduce the alternative vehicle occurs when the recovery information is acquired after the alternative vehicle has entered an operation route.

8. The non-transitory computer readable medium of claim 7, wherein the functions include maintaining the determination to introduce the alternative vehicle when it is judged that the failure of the vehicle is severe.

9. The non-transitory computer readable medium of claim 7, wherein the functions include causing the vehicle to output first display information indicating that the vehicle is not operational when it is judged that the vehicle is not operational due to the failure of the vehicle.

10. The non-transitory computer readable medium of claim 7, wherein the functions include causing the vehicle to output second display information indicating recovery from the failure when the introduction of the alternative vehicle is canceled and the recovered vehicle is redetermined as being operational.

11. A vehicle for managing operation of an alternative vehicle when the vehicle recovers from a failure, the vehicle comprising a controller configured to:
   determine, when it is judged that the vehicle is not operational due to failure of the vehicle, to introduce an alternative vehicle to replace the vehicle, and when recovery information indicating that the vehicle has recovered from the failure is acquired, maintain the determination to introduce the alternative vehicle or cancel the introduction of the alternative vehicle and redetermine the recovered vehicle as being operational, and
   maintain the determination to introduce the alternative vehicle when the recovery information is acquired after the alternative vehicle has entered an operation route.

12. The vehicle of claim 11, wherein the controller is configured to maintain the determination to introduce the alternative vehicle when it is judged that the failure of the vehicle is severe.

13. The vehicle of claim 11, wherein the controller is configured to output first display information indicating that the vehicle is not operational when it is judged that the vehicle is not operational due to the failure of the vehicle.

14. The vehicle of claim 11, wherein the controller is configured to output second display information indicating recovery from the failure when the controller cancels the introduction of the alternative vehicle and redetermines the recovered vehicle as being operational.

\* \* \* \* \*